C. STETEFELDT.

Assignor, by mesne assignments, to STETEFELDT FURNACE CO.

Furnace for Roasting Pulverized Ores.

No. 8,165. Reissued April 9, 1878.

Witnesses

Geo. H. Strong.

Frank R. Brooks

Inventor

Chas. Stetefeldt

By his Attys

Dewey & Co.

N. PETERS, PHOTO-LITHOGRAPHER, WASHINGTON, D. C.

UNITED STATES PATENT OFFICE.

CHARLES STETEFELDT, OF SAN FRANCISCO, CAL., ASSIGNOR, BY MESNE ASSIGNMENTS, TO STETEFELDT FURNACE COMPANY, OF SAME PLACE.

IMPROVEMENT IN FURNACES FOR ROASTING PULVERIZED ORES.

Specification forming part of Letters Patent No. 72,931, dated December 31, 1867; Reissue No. 3,807, dated January 25, 1870; Reissue No. 8,165, dated April 9, 1878; application filed February 19, 1878.

*To all whom it may concern:*

Be it known that I, CHARLES STETEFELDT, of the city and county of San Francisco, and State of California, have invented an Improvement in Furnaces for Chloridizing Silver Ores; and I do hereby declare the following to be a full, clear, and exact description thereof, reference being had to the accompanying drawings.

My invention is intended to provide improvements in furnaces for chloridizing silver ores preparatory to amalgamation.

This furnace is constructed with a shaft, heated by a fire-place, the flames of which enter near its bottom, through which the pulverized ore, mixed with salt, drops, retarded in its fall by the upward motion of the heated air and gases.

The flames passing up the shaft heat the particles of the falling ore, effecting their desulphurization and chlorination, which latter is, to a great extent, achieved by the chlorine, hydrochloric acid, and volatile chlorides which continue to emanate from the roasted ore accumulated at the bottom of the shaft. A flue near the top of the shaft allows the gases to pass into a series of dust-chambers, connected with a chimney.

As the ore has to be pulverized very fine preparatory to amalgamation or other processes of extraction, a part of it will be necessarily carried by the draft directly through the flue into the dust-chambers, and is, consequently, either entirely raw, or, at least, imperfectly roasted, not having been exposed to a sufficient degree of heat.

To effect a perfect roasting and chlorination of this part of the ore, an auxiliary fire-place is connected with the flue, through which the dust passes, and as the ore is so very fine, and in an atmosphere of chloridizing-gases, its chlorination is completed in a moment in passing the flame from the auxiliary fire-place.

To more fully illustrate and describe my furnace, reference is had to the accompanying drawings and letters marked thereon, of which—

Figure 1:
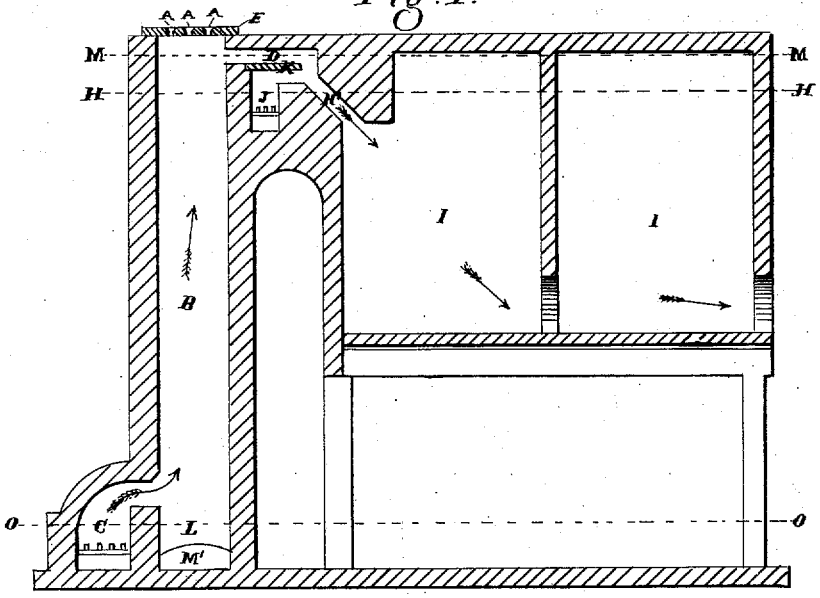
Figure 2:
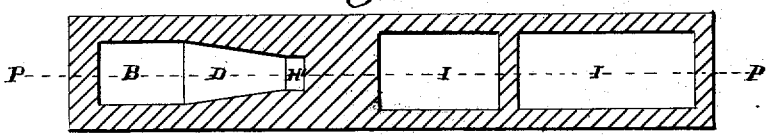
Figure 3:
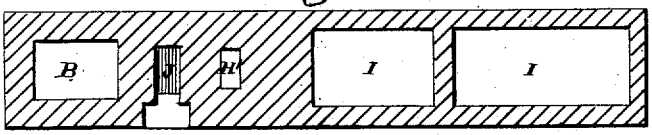
Figure 4:
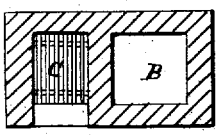

Figure 1 is a section taken through P P. Fig. 2 is a section taken through M M. Fig. 3 is a section taken through H H. Fig. 4 is a section taken through O O.

B represents the perpendicular shaft of the furnace, covered at the top with an iron plate, E, having slits A A A A through which the pulverized ore is continuously fed by machinery.

C is a fire-place near the lower end of the shaft, from which the flame and gases pass up the shaft B, and through the flue D and H′ into the dust-chambers I I.

M′ is a discharge-door, through which the roasted ore is drawn which accumulates in the lower part L of the shaft B.

J is the auxiliary fire-place, covered by the arch K and opening into the flue H′. Here the ore is roasted which is too fine to fall down the shaft B.

The operation of my furnace is as follows, to wit: Fire is made in the fire-place C and J, and as soon as the furnace is hot the feeding machinery is put in motion, and the ore is fed in a continuous stream through the slits A A A. The only attention which the furnace requires is the keeping up of a regular roasting heat. The roasted ore is allowed to accumulate at the bottom of the shaft nearly up to the fire-bridge of the fire-place C. This is very important, as a great amount of chlorine, hydrochloric acid, and volatile chlorine emanate from the charge and act upon the falling ore in the shaft. The roasted ore is discharged through the door M′. The ore which is roasted in the flue H′ by the heat from the auxiliary fire-place J, and deposited in the dust-chambers I I, is taken out from them occasionally.

What I claim as my invention, and desire to secure by Letters Patent of the United States, is—

1. The combination of a shaft, vertical, or nearly so, with the fire-place at or near the bottom, a flue leading from the upper part of the shaft, and an auxiliary fire-place for heating said flue.

2. An auxiliary fire-place and a flue or chamber through which the dust passes escaping from the stack, in combination with a roasting-furnace, for roasting or chloridizing said dust.

3. A supplemental or auxiliary fire-place, J, combined with a furnace, B, fire-place C, dust-flue D, and dust-chamber I, said auxiliary fire-place being arranged to roast the fine ore which is carried out of the furnace B after it has left the main furnace-chamber, substantially as and for the purpose above described.

In witness whereof I have hereunto set my hand and seal.

CHARLES STETEFELDT. [L. S.]

Witnesses:

H. B. McCORMICK,

JNO. L. BOONE.